May 31, 1938.　　A. SCHULLER ET AL　　2,119,117
METHOD OF TREATING CELLULOSE
Filed Dec. 1, 1936
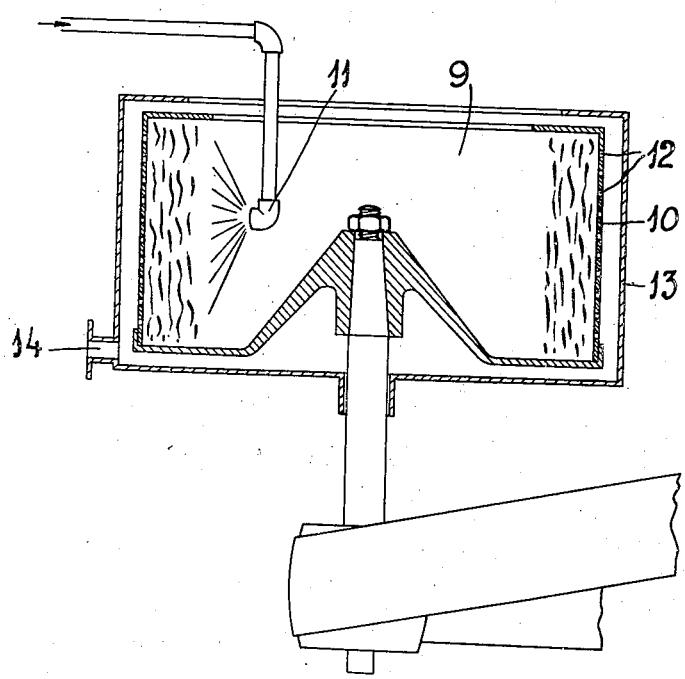
INVENTORS
ALADAR SCHULLER
AND REMI-GUSTAAF TRITSMANS
BY
ATTYS.

UNITED STATES PATENT OFFICE 2,119,117

METHOD OF TREATING CELLULOSE

Aladar Schuller, Antwerp, and Remi-Gustaaf Tritsmans, Mortsel, near Antwerp, Belgium, assignors to Gevaert Photo-Producten, N. V., Antwerp, Belgium Application December 1, 1936, Serial No. 113,646
In Austria December 5, 1935

1 Claim. (Cl. 260—101)

Our invention relates to a treatment of cellulose about to be converted into an ester and more especially to the customary pretreatment for the purpose of removing the water present in cellulose.

As is well known to those skilled in the art, the esterification of cellulose proceeds more readily and uniformly, if the cellulose is not dry, but somewhat swollen. As a rule air-dry cellulose containing about 5-8% water is started from and this water is replaced by an organic liquid.

In this preliminary treatment as hitherto practiced the cellulose was introduced into the organic liquid in loose state or the liquid was poured over the loose cellulose. Now loose cellulose is very voluminous in view of the great number of large interstices between the individual fibres and loose cellulose, owing to the capillary action of these interstices, absorbs the liquid similarly as a sponge absorbs water. For this reason the pretreatment of loose cellulose in order to completely imbibe it with liquid, requires ten times and more liquid by weight of the cellulose.

It is an object of our invention to carry out this preliminary treatment with comparatively small quantities of liquid so as to render it more economical. According to our invention we first slightly compress the cellulose by centrifugal action and then introduce the pretreating liquid into and through the cellulose also under centrifugal action. By this treatment the interstices between the fibres are reduced and the cellulose deprived of its property of absorbing large quantities of liquid. The imbibing of the compressed cellulose with the liquid is brought about by introducing the liquid under centrifugal action. By proceeding in this manner we are able to completely imbibe cellulose with not more than once to twice its weight of liquid.

The mode of proceeding here adopted resembles the use of the centrifuge in the sugar industry where the sugar crystals are freed from the adhering mother liquor with the aid of relatively small quantities of water.

We are now going to describe our invention more in detail with reference to the drawing affixed to this specification and forming a part thereof in which the invention is illustrated diagrammatically by way of example, the drawing showing an axial section of a centrifugal, in which the pretreating liquid is forced across the compressed cellulose by centrifugal action.

Referring to the drawing, 9 is the rotor, 10 the cylindrical wall of the centrifugal formed with perforations 12, 13 is the outer casing, 14 a liquid outlet, 11 a spray nozzle for the introduction of liquid.

The cellulose is first entered into the rotor 9 and slightly compressed on the perforated wall 10 by centrifugal action. While the rotor is running, the pretreating liquid is sprayed onto the inner surface of the cellulose cylinder by the nozzle 11. The centrifugal force causes the liquid to pass through the compressed cellulose and through the perforations 12 escapes first a mixture of the liquid with water and finally pure pretreating liquid. While part of the liquid remains in the cellulose, the bulk is collected in the casing 13 and tapped at 14.

About 150 to 200 liters of pretreating liquid are required to pretreat 100 kgs. cellulose.

In some cases it may be useful to pretreat the cellulose with two or more different liquids, for instance if it is intended to cause swelling of the cellulose by means of a liquid which is not miscible with water. In such a case the water is first expelled with the aid of a liquid such as for instance alcohol, which mixes with water, and only after this has been effected, this liquid is displaced by means of a liquid miscible with it, however immiscible with water, such liquid being for instance benzene.

If it is intended to altogether free the cellulose from water, this may also be done with the aid of a plurality of pretreating liquids. In this case the bulk of the water is displaced by means of some liquid miscible with water, for instance by means of glacial acetic acid, whereupon a small quantity of a liquid is passed through, such as acetic anhydrid, which is capable of binding the residual water.

Various changes may be made in the details disclosed in the foregoing specification without departing from the invention or sacrificing the advantages thereof.

We claim:

The method of displacing water from wet, loose cellulose and pretreating the same which comprises first compressing said cellulose into a cake in a centrifugal filter by centrifugal action and then spraying pretreating liquid onto said cellulose cake while the latter is undergoing centrifugal action, the pretreating liquid being forced through said cellulose cake by centrifugal action and thereby displacing the water originally contained therein.

ALADAR SCHULLER.
REMI-GUSTAAF TRITSMANS.